United States Patent [19]

Pole

[11] Patent Number: 5,030,363
[45] Date of Patent: Jul. 9, 1991

[54] OIL RETRIEVER WITH INTERCHANGEABLE COLLECTION TANKS AND METHOD OF USE THEREFOR

[75] Inventor: Charles D. Pole, Willowdale, Canada
[73] Assignee: ULS Corporation, Toronto, Canada
[21] Appl. No.: 434,355
[22] Filed: Nov. 13, 1989
[51] Int. Cl.$^5$ .............................................. E02B 15/04
[52] U.S. Cl. .................................. 210/776; 114/125; 210/136; 210/242.3; 210/923
[58] Field of Search .................. 114/125, 283; 210/97, 210/136, 242.3, 242.4, 776, 923, 924; 405/66

[56] References Cited

U.S. PATENT DOCUMENTS

| | | | |
|---|---|---|---|
| 3,670,896 | 6/1972 | Hale, Jr. et al. | 210/242.3 |
| 3,693,805 | 9/1972 | Tillett et al. | 210/923 |
| 3,736,898 | 6/1973 | Yamura | 114/125 |
| 3,844,950 | 10/1974 | Aulisa | 210/923 |
| 3,968,041 | 7/1976 | De Voss | 210/242.3 |
| 4,477,348 | 10/1984 | Ayers et al. | 210/924 |
| 4,957,636 | 9/1990 | Wilson et al. | 210/923 |

FOREIGN PATENT DOCUMENTS

3123343 12/1982 Fed. Rep. of Germany ... 210/242.3

Primary Examiner—Robert A. Dawson
Assistant Examiner—Joseph Drodge
Attorney, Agent, or Firm—Daryl W. Schnurr

[57] ABSTRACT

An oil retriever for recovering heavy oil, including bunker c, from a body of water is a self-contained unit that is maneuverable independently of land. The retriever has two pontoons that are spaced apart and parallel from one another. Across the front of the pontoons, there is rotatably mounted a cylindrically-shaped drum with closed ends. The drum is light enough to float on the oil and/or water. The drum is rotated about its longitudinal central axis by a reversible variable speed motor. There are two scrapers extending along the entire rearward side of the drum. A first scraper forms a line of contact with the drum but a second scraper is out of contact with the drum. Between the pontoons to the rear of the drum is a storage tank that is initially filled with water. Most of the storage tank is located below the water surface. As the drum is rotated in such a direction that a forward edge moves downward into the oil and water, some of the oil coats the drum surface, the coating being thin enough to pass between the second scraper and the drum. The first scraper removes the oil and it falls back towards the second scraper. The oil then falls onto the lower scraper and from the lower scraper into the storage tank. A base of the storage tank contains a valve, which is open during the collection process. As the oil builds up in the storage tank, it will float on the surface of the water and will steadily force the water present in the storage tank out the valve. When the tank is filled or nearly filled with oil, the valve is closed, the tank is removed from the retriever and emptied or replaced by a new tank. If the oil is thin enough to be pumped, the tank can be left in the retriever while the oil is pumped out of it. Subsequently, more oil can be collected to refill the tank and the process can be repeated. Previous oil retrievers are relatively inefficient when used to recover heavy oil, particularly when the oil is located in cold water and forms a cohesive sticky mass.

27 Claims, 6 Drawing Sheets

OIL RETRIEVER WITH INTERCHANGEABLE COLLECTION TANKS AND METHOD OF USE THEREFOR

BACKGROUND OF THE INVENTION

1. Field of the Invention

This invention relates to an oil retriever and method of use therefor for recovering heavy oil, including Bunker C, from a surface of a body of water, such as oceans, lakes, rivers and the like and in particular to an oil retriever that is maneuverable independently on water and can operate efficiently to assist in cleaning up oil spills where the heavy oil has been formed into a sticky cohesive mass by cold water.

2. Description of the Prior Art

It is known to have oil retrieving equipment whereby a basin is suspended from a floating vessel, the basin having an open top surrounded by a lip. The basin is positioned so that the lip is just below the surface of the oil and the oil flows into the vessel. The oil is then pumped from the vessel to a storage tank. The floating vessel does not work very well with heavy oil, particularly when the oil is in cold water, as the oil cannot be efficiently pumped. Also, if the vessel is not suspended accurately at the correct depth, more water than oil will enter the vessel. Heavy oil is sometimes removed from a water surface by a plurality of strands of fiber formed into a conveyor belt. The fiber strands soak up the oil from the surface and the fiber is then passed through a set of rollers where the oil is removed and placed in a storage tank. This procedure can be very inefficient as the fibers sometimes contact the water and absorb water rather than oil. It is also known to use partially submerged, hydraulically-operated, perforated steel belts which are suspended from the bow of a vessel. The oil collects in the perforations in the belts and is transferred to a storage tank. Another known recovery unit is an open top well that is supported by floats. An annular overflow weir floats at the well rim allowing the oil and water to fall into the center. Water is pumped continuously from the bottom of the well while a second pump removes oil from the top of the well as and when a sufficient amount of oil has been collected. Chemicals have also been developed to disperse oil into small droplets whereby it can decompose naturally. Of course, the chemical added to the water to disperse the oil further pollutes the water and must be removed.

Previous oil recovery or dispersal systems can suffer from an extreme drop in efficiency when used with heavy oil, particularly when the heavy oil is located in cold water. Further, the efficiency of previous recovery systems can be greatly reduced when the water is choppy or waves are present. Also, previous recovery systems are expensive, complex or messy. Pollution of waterways through oil spills is becoming much more of public concern. From the recent Alaskan oil spill, where numerous cleanup personnel worked on various beaches with hand-held cloths to scrub the rocks, it can be seen that current oil recovery equipment is not satisfactory.

SUMMARY OF THE INVENTION

It is an object of the present invention to provide a self-contained oil retriever that can be efficiently and effectively used to recover heavy oil from the surface of water. It is further object of the present invention to provide an oil retriever that is relatively inexpensive, simple to operate or less messy than previous oil retrievers.

An oil retriever for recovering heavy oil, including Bunker C, from a surface of a body of water, such as oceans, lakes, rivers or the like is a self-contained unit with a front and a rear. The retriever comprises a cylindrically-shaped collecting surface, removable located immediately adjacent to said collecting surface and means to transfer the oil collected from the collecting surface to said storage means. The buoyancy means for the retriever provides the buoyancy necessary to keep the retriever afloat. The surface is rotatable about its longitudinal central axis and there are first power means to rotate said collecting surface about said axis. The storage means initially contains water and has valve means located near a base of said storage means for allowing said water to escape as said storage means is being filled with oil. The storage means is located to receive oil collected on said collecting surface, said oil replacing said water in said storage means until such time as said storage means is filled with collected oil. The storage means is readily remove from and replaceable in said retriever. The collecting surface is buoyant enough to float on the surface of the body of water and is located at the front of the retriever and is mounted so that the collecting surface can move independently of a roll and pitch of a remainder of the retriever in response to movement of the surface of the body of water during collection of oil by the retriever. There are means to support said storage means relative to said collecting surface. There are second power means to enable the collecting surface to be moved around said body of water.

Preferably, the oil retriever is rotated so that a forward edge of the collecting surface moves downward into the oil during operation for collection of oil.

A method of recovering heavy oil, including Q Bunker C, from a surface of a body of water, such as oceans, lakes, rivers or the like uses an oil retriever having a cylindrically-shaped collecting surface for contacting the oil and water. The surface is rotatable about its longitudinal central axis, with first power means to rotate said collecting surface about said axis. There is a removable storage tank for storing the oil collected by the collecting surface, said tank initially being filled with water and having a valve to allow the water in the tank to escape as the tank is filled with Q oil. There are scraper means to remove the oil from the collecting surface and transfer it to the storage tank and support means for supporting said collecting surface relative to said surface of the body of and water so that the collecting surface contacts said surface as it rotates during collection of oil. There are second power means to enable the collecting surface to be moved about said surface of the water, with control means to control the second power means. The method includes the steps of activating the second power means and control means to position the collecting surface of the retriever into an oil slick on a surface of the body of water, opening the valve on the storage tank to allow water to escape as the tank fills activating the first power means to rotate the with oil collecting surface in a direction so that a forward edge thereof moves downward into the oil, collecting the oil into the storage tank until the tank is filled, while periodically stopping the first power means if necessary and reactivating it to rotate the collecting surface in a reverse direction to release any oil clogged between the collecting surface and the tank, closing the valve on the storage tank when the tank has been filled with oil and stopping the rotation of the collecting surface, removing the tank from the retriever, replacing it with another tank that is filled with water and repeating the collection process to fill the tank and retriever with oil.

DESCRIPTION OF A PREFERRED EMBODIMENT

Figure 1:
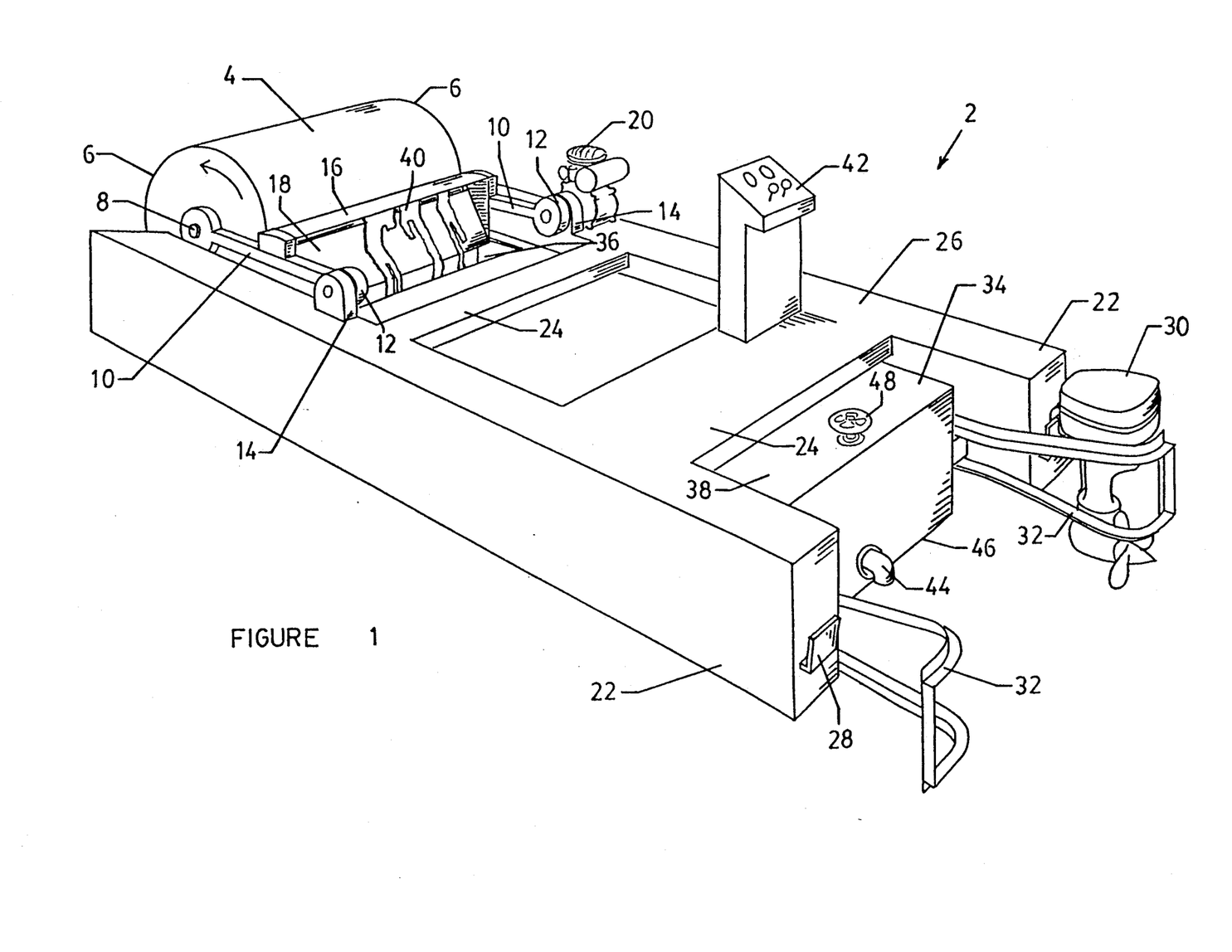
FIG. 1 is a perspective view of one embodiment of an oil retriever.

Referring to FIG. 1 in greater detail, there is shown an oil retriever 2 having a cylindrically-shaped collecting surface 4. Preferably, the cylindrically-shaped collecting surface 4 is a drum with closed ends 6. The drum is preferably water-tight and is light weight so that it is buoyant enough to float on the oil alone or on the oil and water. The drum 4 will move up and down with the waves on the water independently of the rest of the retriever 2. Preferably, the drum will be designed so that a lower edge thereof will be located below the surface of the water when the drum is allowed to float on the oil and water. A shaft 8 extends along a longitudinal central axis of the drum 4 and either end of the shaft 8 (only one of which is shown in FIG. (1) is rotatably connected to a side arm 10. Each of the side arms 10 has an end 12 opposite to the drum 4. Each end 12 is pivotally mounted on a base 14. Approximately midway along the length of the side arms 10 there is mounted a first scraper 16 and a second scraper 18. The scrapers 16, 18 extend between the two arms 10 with one end of each scraper being affixed to one arm and another end of each scraper being affixed to the other arm. Since the scrapers are affixed to the arms 10, the position of the scrapers relative to the drum 4, subject to manual adjustments that are made from time to time, will be constant Preferably, the position of the scrapers relative to the drum can be manually adjusted from time to time. No adjustment means for the scrapers are shown as various conventional adjustment means are obvious to those skilled in the art. For example each end of the scrapers could have a transverse slot therein with a bolt affixed to the side arms 10 extending through each slot. First power means 20 is located near one side of the collecting surface 4 to rotate the collecting surface about its longitudinal central axis. Preferably, the first power means 20 is a gasoline motor. However, other motors such as diesel, electric or air hydraulic could be utilized. Preferably, the motor has a variable speed drive as the optimum speed for the most efficient recovery of oil will vary with the type of oil, the viscosity, the temperature, the thickness of the actual layer of oil and other factors. The connection of the motor 20 through various gears or directly to the shaft 8 has been omitted as the connection is conventional. Obviously, the shaft 8 would extend beyond the arm 10 on the side of the drum 6 that is not shown in FIG. 1.

At either side of the collecting surface 4 and extending rearward therefrom, there is located a pontoon 22. The pontoons 22 are floats and are substantially parallel to one another and are held in a fixed position relative to one another by cross-members 24 that form a Q frame for the retriever. In FIG. 1, these cross-members 24 also serve as part of a deck 26. At the rear of each pontoon 22, there are mounting means 28 for an outboard motor 30 (only one of which is shown in FIG. 1). The outboard motors 30 are shielded by guards 32 and together form a second power means to move the retriever to various locations on the water. Between the pontoons 22 and to the rear of the collecting surface 4, there is located a storage tank 34 which provides means for storing oil collected by the collecting surface 4. The storage tank 34 extends from the collecting surface 4 towards a rear of the retriever 2, but is spaced apart from the collecting surface 4 to allow the collecting surface to rotate. The tank 34 contains an opening 36 in its upper surface 38 to allow oil collected from the collecting surface 4 to be transferred from the collecting surface to the storage tank. Preferably, the opening 36 has an oil-tight cover so that when the tank is filled with oil and is being transported back to a ship or other receiving location, the oil is completely enclosed within the tank and cannot spill out back into the water. As can be seen, oil 40 runs along the second scraper 18 and into the tank 34 through the opening 36. The first scraper 16 forms a line of contact with the collecting surface 4 and removes the oil from said collecting surface. The scraper 16 also assists in transferring the oil to the storage tank 34 as the oil falls from the scraper 16 onto the scraper 18 and from there by gravity into the storage tank 34 through the opening 36. There are means (not shown in FIG. 1) on the pontoons 22 for supporting the storage tank 34 relative to the collecting surface 4. The motors 30 provide second power means to enable the collecting surface 4 and the entire oil retriever to be moved to various locations on the water (not shown in FIG. 1). The retriever 2 is controlled by control means 42 and is maneuverable independently of land.

The tank 34 has a valve 44 located near a base 46 of the storage tank. The valve 44 can be opened or closed by appropriately rotating a handle 48 located on an upper surface 38 of the tank 34. The tank 34 is held in position relative to the collecting surface 4 between the pontoons 22 by retention means that are not shown in FIG. 1. There can be trim adjustments in the pontoons 22 and side tanks in the storage tank 34 which are not shown in FIG. 1. The tank 34 has an upper edge that is located between the surface of the water and the means to transfer the oil on the collecting surface to the storage means.

In operation, when it is desired to install new or replacement storage tank 34 into the retriever 2, the previous storage tank is removed by floating the tank out the rear of the retriever 2. A replacement storage tank is then floated into the rear of the retriever 2 between the pontoons 22. The replacement storage tank is filled with water and the valve 44 can be opened or closed, but will likely be closed. When the replacement storage tank is in the position shown for the tank 34 of FIG. 1, it is locked in that position and any cover (not shown) for the opening 36 is opened. Also, the valve 44 is opened, if it is not already open, by appropriately turning the handle 48. The motors 30 (only one of which is shown in FIG. 1) are then activated to maneuver the retriever 2 into an oil slick on a particular body of water where the retriever is utilized. The control means 42 will contain steering means for the motors 30 as well as forward, reverse and speed controls. Preferably, the control means 42 also contain forward, reverse and speed controls for the motor 20 which rotates the drum 4. While the drum 4 can be operated in either direction to remove oil, it has been discovered that the drum is much more efficient in removing oil when it is rotated in a direction such that a forward edge (i.e. a side away from the storage tank) rotates downward into the oil and water. Usually, the collecting surface extends through an oil layer on top of the water so that a lower edge of the collecting surface 4 is located slightly below the water surface. Thus, the collecting surface will contact both the oil layer and some water as it is rotated where the collecting surface floats on the oil and water.

As the collecting surface rotates, oil will cling to it and be removed by the first scraper 16. The scraper 16 and the scraper 18 will then transfer the oil from the collecting surface 4 into the storage tank 34 through the opening 36. As oil enters the opening 36, it will, by gravity, force an equivalent amount of water already present in the tank to exit through the open valve 44. When the tank is filled or nearly filled with oil, the rotation of the drum 4 can be stopped, the locking means for the tank can be released and the tank can be removed from the retriever 20 and replaced with another replacement tank containing only water. Periodically, during the collecting process, it may be desirable to stop the rotation of the collecting surface 4 and to rotate the collecting surface in the opposite direction so that the side nearest the storage tank moves downward into the oil and water. This procedure will unclog any oil that is located between the drum 4 and the storage tank 34 beneath the scrapers 16, 18. It can be seen that the drum 4 will float upward and downward vertically relative to the pontoons 22 as the retriever encounters waves on the body of water on which it is used. Also, the drum 4 will move upward and downward vertically as the pitch of the retriever 2 is varied. Since the scrapers 16, 18 are mounted on the side arms 10, they will always be maintained in a fixed relationship relative to the drum 4. The scrapers preferably have adjustment means thereon (not shown in FIG. 1) so that the location of the scrapers can be adjusted depending on the operating conditions.

Figure 2:
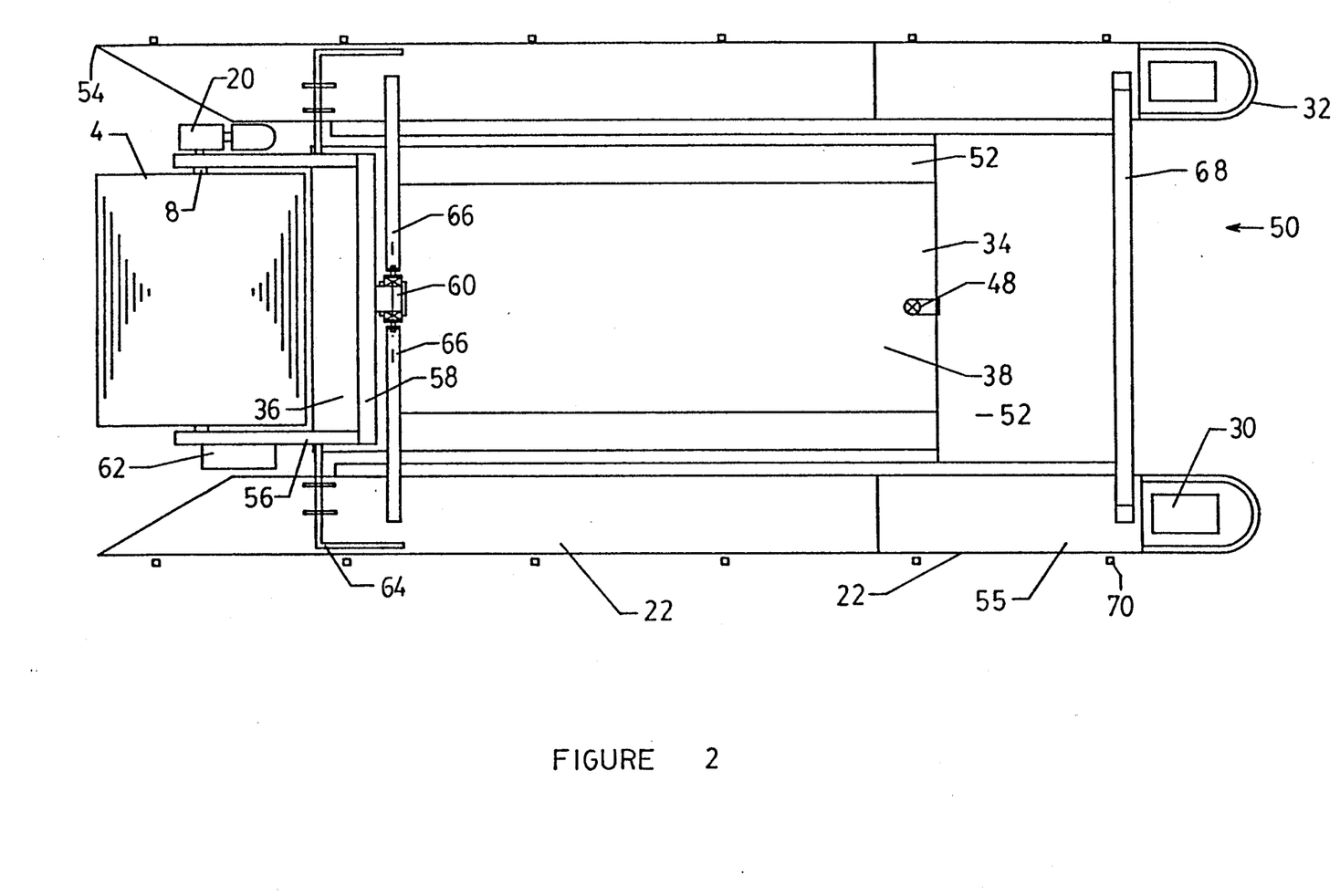
FIG. 2 is a top view of another embodiment of an oil retriever where a drum is mounted differently from the retriever of FIG. 1.

In FIG. 2, there is shown a top view of an oil retriever 50. The oil retriever 50 is essentially the same as the oil retriever 42 except for the manner in which the collecting surface or drum is mounted. Those components of the retriever 50 that are the same or similar to the components of the retriever 2 will be identified using the same reference numerals. For illustration purposes, the control means and the deck have been omitted from the retriever 50 shown in FIG. 2. It can be seen that the storage tank 34 has side tanks 52 located along each side. The flotation provided by the side tanks can be designed so that the tank 34 can be floated into or out of the rear of the retriever 50 at a desired depth within the guide means (not shown in FIG. 2). The oil storage portion of the tank 34 is T-shaped because of the location of the side tanks 52 along each side. The side tanks 52 terminate near a front of the tank 34 as the opening 36 must extend across the entire length of the drum 4 to receive the oil. The scrapers have been deleted from FIG. 2 so that the upper surface 38 of the tank 34 including the opening 36 can be seen in its entirety. The side tanks can be used with air or used as ballast tanks and partially filled with water. While the oil storage section is preferably filled with water before any oil collection begins, the oil storage section of the tank could be completely empty with stability being provided by the ballast in the side tanks.

Figure 6:
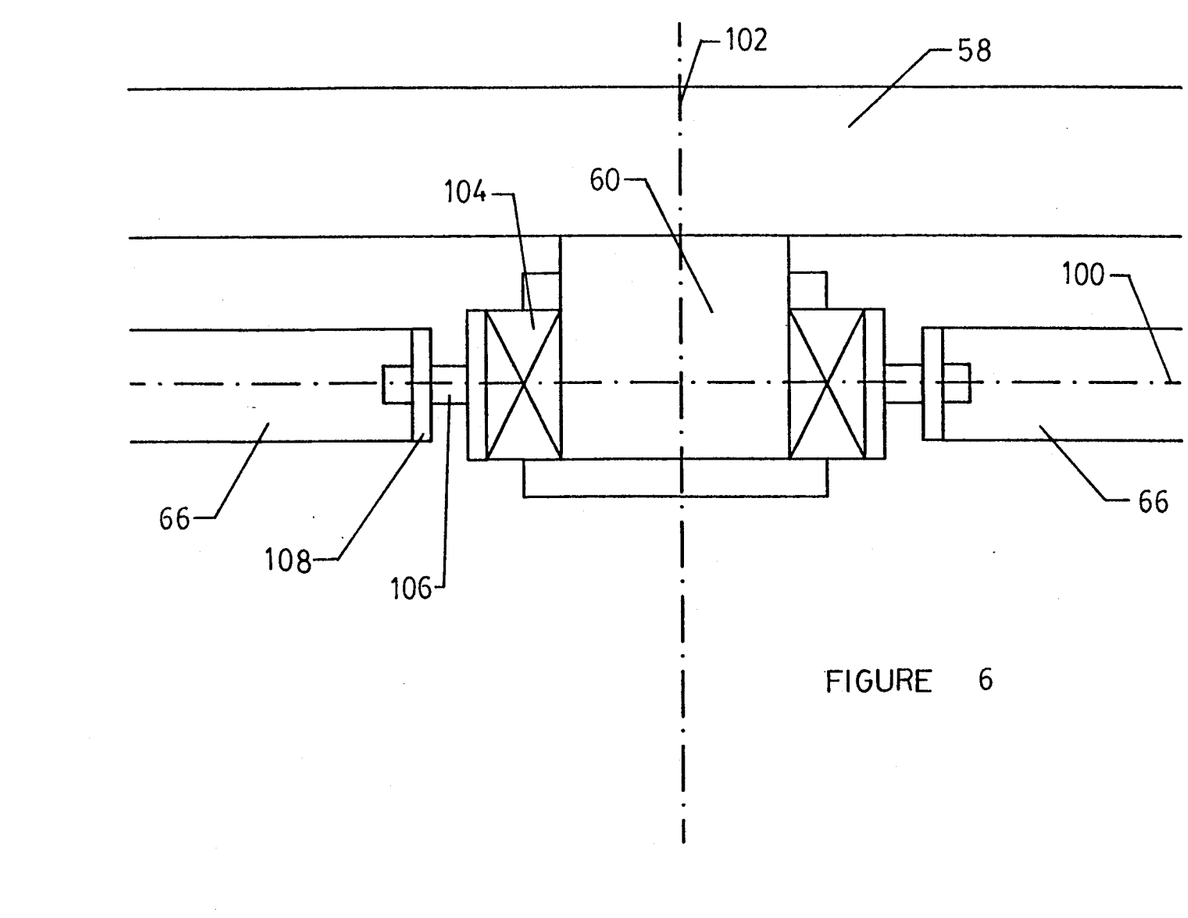
FIG. 6 is an enlarged view of a trunnion mount for the embodiment shown in FIG. 2.

The pontoons 22 each have a forward outer edge 54 that tapers inward to channel the oil and water encountered by the retriever towards the drum 4. At the rear of each pontoon 22, there is located a trim tank 55. The trim tanks 55 allow the trim of the retriever to be adjusted to correspond to the buoyancy of the storage tank 34. The shaft 8 of the collecting surface or drum 4 is pivotally connected at either end to side arms 56. An end of the side arms 56 opposite to the drum 4 are connected to opposite ends of a connecting member 58. The connecting member 58 is in turn connected to a centrally mounted trunnion 60. The trunnion 60 is mounted, as is best shown in FIG. 6, to permit both vertical movement and horizontal rotation of the drum 4 about its transverse central axis, arms 56 and connecting member 58 relative to the pontoons 22. In other words, the drum will self-adjust when subjected to changes in the pitch or roll of the retriever 50.

The motor 20 is mounted on the side arm 56 so that it can move with the shaft 8 and drum 4. A counterweight 62 is mounted on the other arm 56 on a side opposite to the motor 20 to balance the weight of the motor. At each side of the retriever 50, there is located a dog lever 64 which can be manually opened or closed to hold a front edge of the tank 34 in position so that oil collected will be transferred into the tank through the opening 36. Cross-members 66, 68 at a front and rear respectively of the retriever 50 hold the pontoons 22 in a fixed position relative to one another. When the dog levers 64 are both open, the tank 34 can be floated rearward and ultimately separated entirely from the retriever 50. For ease of illustration, a guide rail 70 is only partially shown in FIG. 1.

Figure 3:
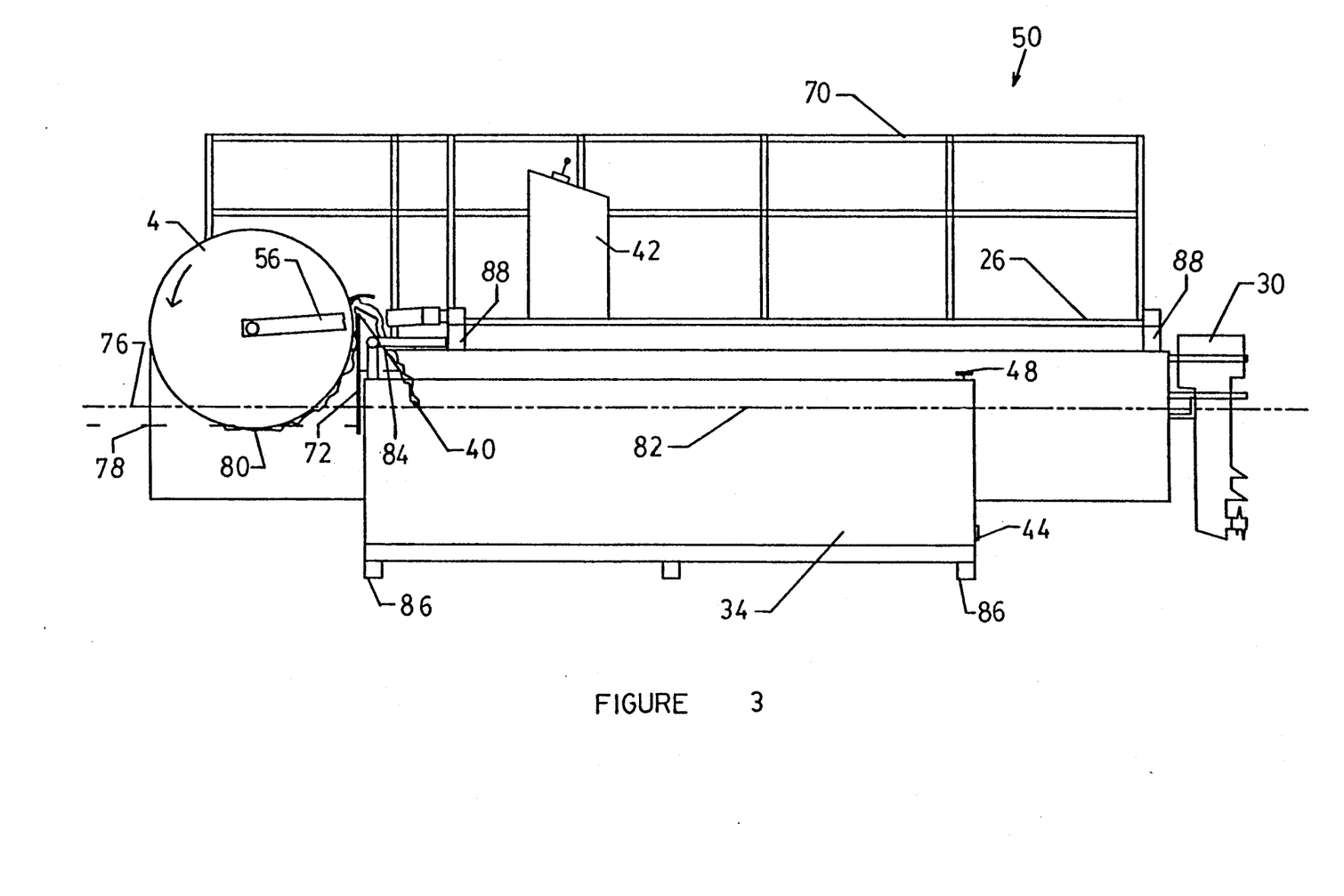
FIG. 3 is a side view of an oil retriever with control means added.

In FIG. 3, there is shown a side view of the retriever 50 with a pontoon on a near side of the retriever removed. For illustration purposes, the side arm 56 is discontinued at its central portion to expose the entire scraper 18. There is a baffle 72 located between the drum 4 and a front edge 74 of the tank 34. The baffle prevents oil collected on the drum from building up against the front 74 of the tank 34. As will be noted, there is an oil level line 76 which is located above a water level line 78 in front of the baffle 72. The two lines 76, 78 show the thickness of the oil layer on the water surface. It can also be seen that a lower edge 80 of the drum 4 is slightly below the surface 78 of the water. If the oil is thicker, the drum would preferably be lowered. To the rear of the baffle 72, most of the oil has been removed and the line 82 becomes the water level line. The baffle has a triangular upper portion to provide a sloped surface 84 for receiving oil from the second scraper 18 and transferring it into the tank 34 through the opening 36. The baffle could be supported by the side arms 56 so that it will move with the drum rather than being supported by the pontoons or deck. The storage tank 34 has legs 86 thereon to assist in moving the tanks from one place to another, for example, through the use of a forklift truck. Vertical connecting members 88 support the deck 26 on the pontoons 22. The control means 42 is located on an opposite side of the deck 26 for the retriever 50 than it is for the retriever 2. The control means could be located in any convenient place on the retriever including a center of the deck.

Figure 4:
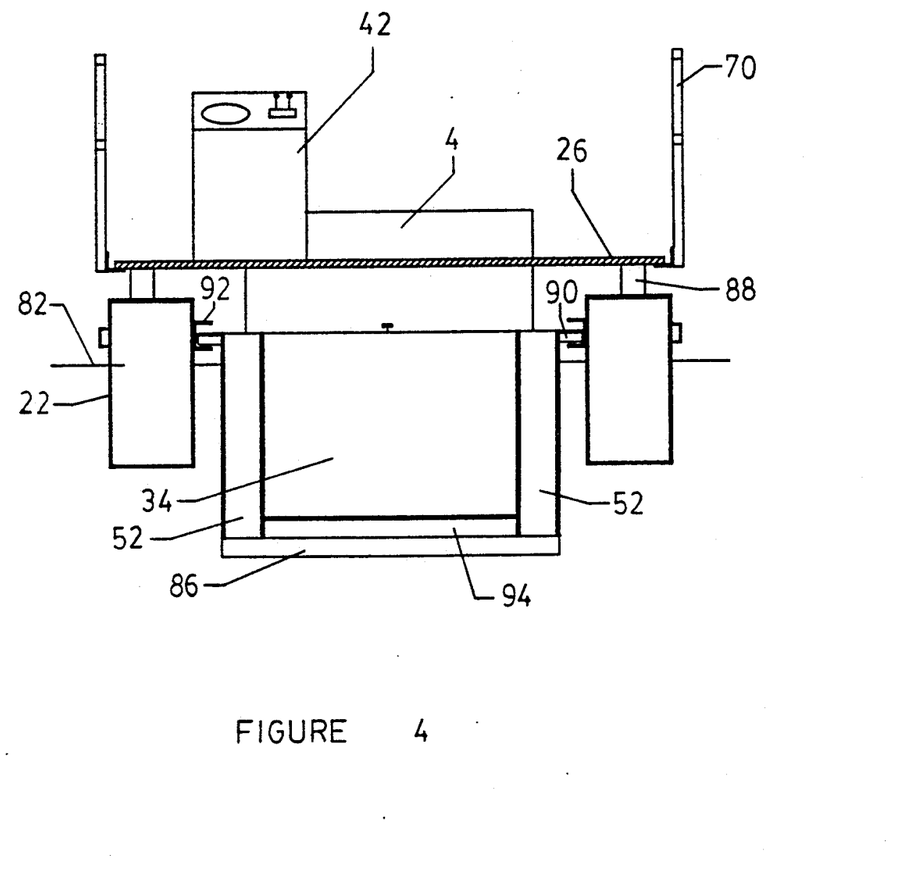
FIG. 4 is a partial sectional rear view of the oil retriever of FIG. 3.

In FIG. 4, there is shown a partial rear view of the retriever 50. It can be seen that the tank 34 has a flange 90 extending horizontally along either side thereof. The flange 90 is sized to fit within a horizontal U-shaped channel 92 that extends along an interior of each pontoon 22. It can be seen that the tank 34 can slide horizontally relative to the pontoons 22 with one of the flanges 90 located within each of the channels 92. Once the tank is in the desired forward position relative to the pontoons 22, the dog levers can be closed to hold the tank in that position. It can also be seen that the tank 34 shown in FIG. 4 has a liner tank 94 along a base thereof. Unlike the side tanks 52, the purpose of the liner tank 94 is not to provide buoyancy but to provide means whereby oil collected in the tank can be heated to make the oil less viscous and easier to pump. For example, once a storage tank 34 has been filled with oil, steam can be passed through the side tanks 52 and the liner tank 94 to heat the oil within the tank so that it will flow easier.

Figure 5:
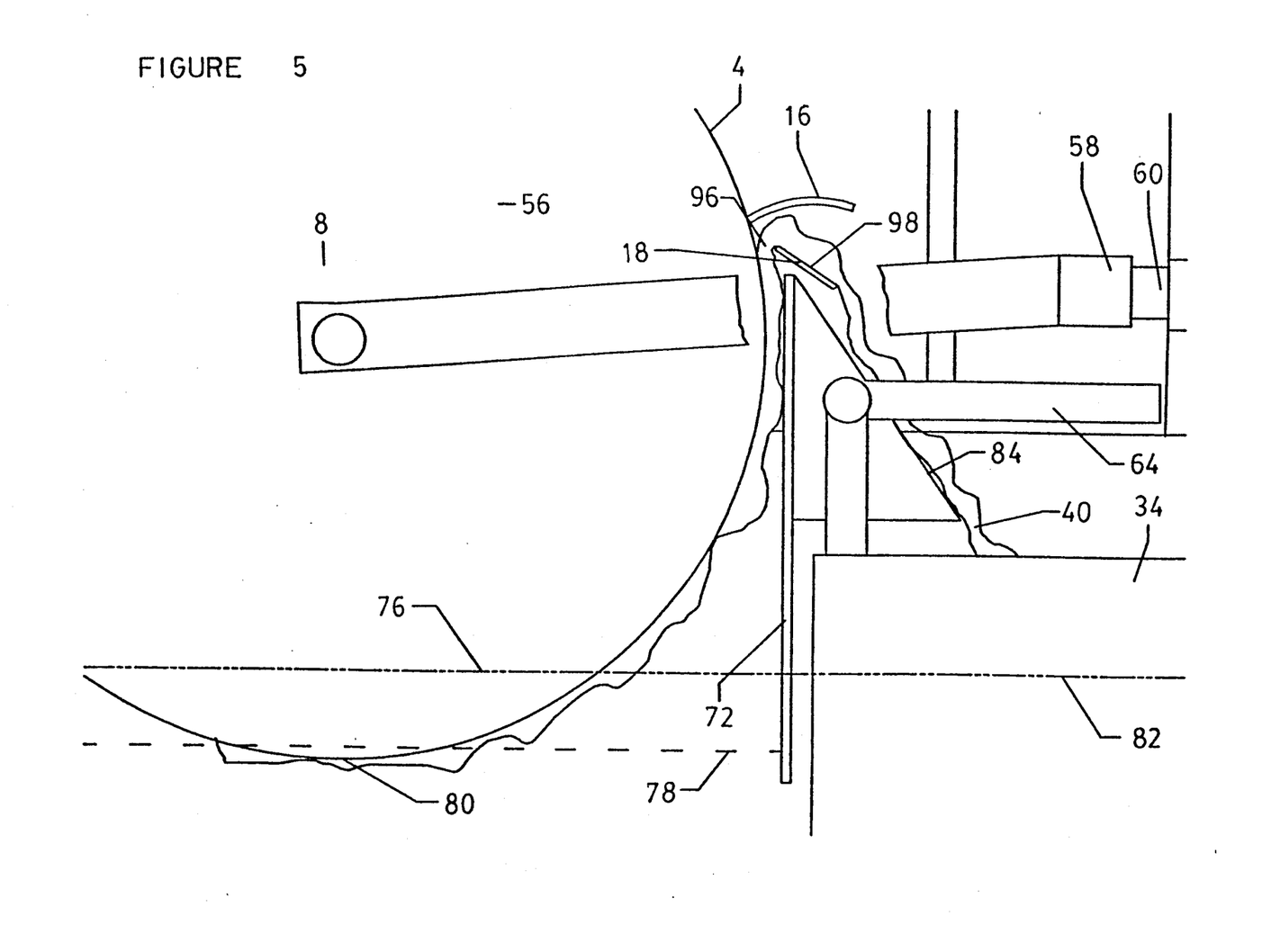
FIG. 5 is an enlarged side view of part of a drum and scrapers.

In FIG. 5, there is shown an expanded partial side view of the drum 4, the scrapers 16, 18, the baffle 72 and the storage tank 34. Again, for illustration purposes, the side arm 56 is discontinued at its central portion so as not to prevent the scraper 18 from being viewed. It can be seen that the first scraper forms a line of contact with a cylindrical surface of the drum 4. The second scraper 18 is spaced apart from the cylindrical surface of the drum 4 by a gap 96 to allow a coating of oil collected on the collecting surface to pass by the scraper 18 as the drum rotates upwards past said scraper 18. As the drum rotates so that the oil 40 comes into contact with the scraper 16, the oil 40 is almost entirely removed from the collecting surface 4. The first scraper 16 causes the thickness of the oil to greatly increase and the oil 40 then falls off the scraper 18 onto an upper surface 98 of the scraper 18. From the upper surface 98 of the scraper 18, the oil falls onto the sloped surface 84 of the baffle 72 and ultimately into the tank 34 through the opening 36. Of course, the sloped surface 84 can be eliminated by further lengthening the second scraper 18. Similarly the second scraper 18 can be eliminated by varying the size and location of the sloped surface 84. However, the oil will fall faster into the tank 34 if it changes from one surface to another and falls through the air as much as possible. During operation, if the oil clogs up the space between the scraper 18, the drum 4, the oil level 76 and the baffle 72, the rotation of the drum can be stopped and the drum can be rotated in the opposite direction so that a side of the drum nearest to the storage tank moves downward rather than upward in order to clean the space. It is possible, if the oil in the space builds up too much, that the oil will pass underneath the baffle 72.

In FIG. 6, there is shown an enlarged top view of the connection of the trunnion 60 relative to the cross-member 66. A pitch axis 100 for the drum 4 extends through a longitudinal central axis of the cross-members 66. A roll axis 102 for the retriever extends through a central axis of the trunnion 60. The trunnion 60 is rotatably mounted in a circular bearing 104 to allow the trunnion 60 to rotate about the roll axis 102. Further, the bearing 104 is secured by pins 106 which are pivotally mounted within bearings 108 located within each part of the connecting members 66 to allow rotation about the pitch axis 100. Thus, when referring back to FIG. 2, it can be seen that the drum 4 will self-adjust as it floats on the oil and water for changes in the pitch of the retriever 50 as well as for changes in the roll of the retriever 50. Thus, the drum will be maintained in the desired position relative to the surface of the oil and water on which the retriever is being used as much as possible.

Preferably, the collecting surface is a smooth surface. However, numerous changes could be made to the surface within the scope of the attached claims. For example, a plurality of radial fins could be installed on the collecting surface to assist in removing extremely thick oil and also to remove other debris. Alternatively, the collecting surface could be corrugated or could have circular radially extending flanges mounted thereon. The flanges could be spaced apart in a horizontal direction. This would increase the surface area on which the oil could form a film. For any of these changes, corresponding changes would be required in the scrapers 16, 18 so that the collecting surface could still be rotated relative to these scrapers and the scrapers would still function to remove the oil from the collecting surface and to transport it to the storage tank.

In FIGS. 3 and 5, the scraper 16 is shown as having a curved cross-section whereas the scraper 18 has a straight cross-section. It is believed that the downward curve in the scraper 16 allows the film of oil to build up to sufficient thickness so that it will not fall back into the water through the gap 98. Numerous variations can be made in the scrapers. The scraper 16 could be flat rather than curved. The scraper 18 could be heated to decrease the viscosity of the oil and assist in the downward flow. The second scraper 18 could be eliminated entirely with the tank placed closer to the drum. Further, the baffle 72 and plate 84 could replace the scraper 18.

Numerous variations could be made in the drum itself and the means to rotate the drum. Depending on the size of the drum, the shaft 8 could be eliminated. If necessary, the drum could be reinforced and rotated by attachments to the drum at the center of each end. Also, the pontoons and drum could be designed so that there are rollers on the pontoons at a sufficiently low level that a rim at either end of the drum could rest on the rollers for rotation. Further, a drum containing a shaft could be rotated through bearings on the shaft itself where the shaft would remain stationary during the rotation. A drum could have a driving motor located inside the drum and attached to the shaft.

Preferably, the pontoons each contain a trim tank so that the trim of the retriever can be adjusted to match the flotation level of the storage tank. Alternatively, the flotation level of the storage tank could be varied to match the flotation level of the retriever. A forward edge of the pontoons could have baffles or wings that extend forward and outward from each of the pontoons, the baffles or wings forming a large V to assist in channeling oil towards the drum. The retriever would thus remove the oil from a much wider path than the width of the retriever itself.

Since the storage tank 34 is filled with water at the outset and the water is slowly replaced by oil during the filling of the tank, the tank will maintain a constant draft throughout the filling process. Thus, the filling of the tank will not require any large adjustment in the trim of the retriever. While the side tanks 52 are not essential, they can be extremely advantageous as they allow for simple adjustment of the draft in the tank, when desired.

The tank could also be designed to receive a flotation collar for use when it is transferred to or from the retriever. Further, the tank could be fitted with eye pads for easy removal by a crane with slings. The valve 44 will be advantageous to facilitate emptying oil from the tank provided that the oil is thin enough to flow through the valve. The substantially constant draft of the tank, whether it contains oil or water, makes it relatively easy to install the tank on the retriever or to remove it.

The overall size of the retriever will vary with the type of use that is likely to be encountered. For example, while the overall length of the pontoons could range from ten feet to one hundred feet or even larger, where the retriever is used within a harbour to clean up oil spills, a pontoon length ranging from sixteen feet to twenty feet would likely be suitable. The cross-sectional size of the pontoons will vary with the length but for harbour use a pontoon depth between eighteen inches and four feet and a width between twelve inches and three feet would be suitable. The width of the storage tank should always correspond and be slightly larger than the length of the drum. If the drum has closed ends so that it is water-tight and filled with air, the drum will float on the water surface and thus the weight of the drum due to a large size should not become a problem. The diameter of the drum will vary with the size of the pontoons but would generally be between two feet and ten feet. For example, a retriever for use in a harbour with a pontoon length of twenty feet would have a drum diameter ranging from three to six feet.

Preferably, the drum will be designed to float with a lower edge of the drum is slightly below the surface of the water which, of course, is located beneath the surface of the oil. While it is preferable that the drum float, it is possible to utilize the invention, particularly in calm waters, when the drum is set in a fixed vertical position, relative to the pontoons. The collecting surface can be made to float in various ways within the meaning of the attached claims. When a drum is used with open ends the drum itself could be made of light-weight durable material that will float. Alternatively a flotation collar or collars could be used on the drum. The drum will respond more quickly and noticeably to waves than the pontoons will. The depth of the drum below the surface of the oil could be as much as half the diameter of the drum but preferably ranges from two inches to one foot.

In the embodiments of the retriever shown in the drawings, the scrapers and drum are designed so that the drum is rotated in such a manner that the forward edge of the drum moves downward into the oil during the collection process. It has been discovered that the drum is much more efficient in collecting oil when it is rotated in this direction rather than the opposite direction. However, the drum could be used to collect oil through rotation in the opposite direction so that a forward edge of the drum moves upward from the oil. This would necessitate a change in the scrapers. Only one scraper would be required. That scraper would form a line of contact with the collecting surface of the drum and would be shaped so that oil would simply flow down an upper surface of the scraper into the storage tank. It is believed that when the forward edge of the drum moves downward, the surface of the drum is virtually water free and the oil will therefore stick to it quite readily. When the drum is turned in the opposite direction so that the rearward edge moves downward, if the drum is low enough so that it contacts the surface of the water beneath the oil, it is believed that there is a film of water on the surface of the drum as it passes through the oil layer and this greatly reduces the amount of oil that will stick to the drum. Thus, when the drum contacts only the oil, it should accomplish the same level of efficiency regardless of the direction of rotation. The retriever will work satisfactorily where the forward edge of the drum is rotated upward so long as the lower edge of the drum contacts only the oil and not the water. However, the thickness of the oil layer on the water surface will depend on the viscosity of the oil, the size and seriousness of the oil spill, the containment means used for the spill, as well as the efficiency with which the oil is recovered. Also, as the oil retriever recovers oil, the thickness of the oil layer on the water will be substantially reduced. Further, when the water is not calm the thickness of the oil layer will vary with each wave. Therefore, it will be extremely difficult to operate the oil retriever in such a manner that the lower edge of the drum would only contact the oil layer and not contact the water beneath it. Thus, the preferred direction of rotation for the drum is to have the forward edge move downward.

The dimensions of the storage tank will vary with the size of the retriever itself. Obviously, the method of removing the storage tank from the water will be a large factor in determining the size. The tank must correspond to the size of the retriever itself. For a retriever used in a harbour, a tank having a width ranging from three to eight feet, a length ranging from six to fourteen feet and a depth ranging from two to six feet would be suitable.

Retrievers designed for ocean use will usually be much larger than retrievers designed for harbour use. The expected size of the seas must be taken into account as well as the magnitude of possible oil spills. It may be desirable to locate baffles within the tank to break up the free surface of the oil/water to prevent the oil from spilling out the opening as the retriever pitches or rolls with the waves. The baffle will also prevent the oil and/or water in the storage tank from reducing the stability of the retriever.

The valve in the base of the storage tank equalizes the pressure within and outside the tank and can greatly vary in size depending on the size of the tank itself. The valve could range between one-half inch and twelve inches in diameter but a range of three to four inches is preferred. Of course, a plug could be used to close an opening in the base of the tank but a valve is much more practical. Various means could be used to allow an operator of the retriever to readily determine when the storage tank has been filled with oil. For example, one end of an open-ended pipe could be suspended just above a floor of the tank. The pipe would be installed before any oil was collected. An interior of the pipe would be filled with water from the tank. When the tank was nearly full, oil would rise to the surface of the water in the pipe.

Concerning materials, the scrapers could be made from steel, plastic, aluminum or various other materials. The second scraper is preferably made of steel or aluminum as this scraper could be heated. The pontoons could also be made of a variety of materials as will be readily apparent to those skilled in the art. However, steel may be the most practical for the pontoons. The cross-sectional shape of the pontoons could be round or square or various other shapes. It is believed that the most practical cross-sectional shape is square or rectangular as that corresponds to the shape of the tank and the deck. Also, a square or rectangular pontoon presents a better channel to the oil entering the retriever than a round pontoon. The cross-members holding the pontoons in a fixed position relative to one another would preferably be made of steel, but plastic, aluminum or other materials can be used provided they have sufficient strength. The storage tank could also be made of a variety of materials but steel is preferred, particularly when it might be desired to heat the tank to thin the oil prior to emptying the tank. The drum can also be made of various materials. For example, steel, aluminum, fiberglass or various plastics.

What is claim as my invention is:

1. An oil retriever for recovering heavy oil, including bunker c, from a surface of bodies of water such as oceans, lakes, rivers or the like, aid retriever being a self-contained unit with a format and a rear and comprising a cylindrically shaped collecting surface, removable storage means located immediately adjacent to said collecting surface and means to transfer to the oil collected from the collecting surface to said storage means, for the retriever providing the buoyancy necessary to keep the retriever afloat, said surface being rotatable about its longitudinal central axis, with first power means to rotate said collecting surface about said axis, said storage means initially containing water and having valve means located near a base of said storage means for allowing said water to escape as said storage means is being filled with oil, said storage means being located to receive oil collected on said collecting surface, said valve means burning oil to replace said water in said storage means until such time as said storage means is filled with collected oil, said storage means being readily removable from and replaceable in said retriever, said collecting surface being buoyant enough to float on the surface of a body of water and being located at the front of said surface can move independently of a roll and pitch of a remainder of the retriever in response to movement of the surface of the body of water during collection of oil by the retriever, means to support said storage means relative to said collecting surface and second power means to enable the collecting surface to be moved around said body of water.

2. An oil retriever as claimed ion claim 1 wherein the storage means has a buoyancy means to keep it afloat independent of the remainder of the retriever.

3. An oil retriever as claimed in claim 2 wherein the buoyancy means of the retriever and the buoyancy means of the storage means are adjustable relative to one another.

4. An oil retriever as claimed in any one of claims 1, 2, or 3 wherein the collecting surface is a drum with closed ends, said drum being watertight.

5. An oil retriever as claimed in any one of claims 1, 2 or 3 wherein the collecting surface is a drum with closed ends and a center of each and is rotatably mounted on an arm, each arm being connected to a cross-member said cross-member having a central portion that is rotatably connected to a frame of the oil retriever, the rotatable connection permitting vertical movement and horizontal rotation about its transverse central axis of the drum relative to the remainder of the retriever.

6. An oil retriever as claimed in any one of claims 1, 2 or 3 wherein the buoyancy means for the retriever is provided by two pontoons, one along each side of the retriever and the collecting surface is a drum with closed ends and a center of each end is rotatably mounted on an arm, each arm having an end opposite to that to which the drum is mounted, said opposite end being pivotally mounted on a base, there being one base for each arm each base being affixed to one of the pontoons, said arms permitting the drum to be rotated and permitting vertical movement of the drum independently of movement of the remainder of the retriever, the drum being light enough to float on the surface of the body of water.

7. An oil retriever as claimed in any one of claims 1, 2 or 3 wherein the buoyancy means of the collecting surface is operable such that the collecting surface floats on the surface of the body of water so that a lower edge of the collecting surface is slightly below a layer of oil and said body of water surface.

8. An oil retriever as claimed in any one of claims 1, 2 or 3 wherein the storage means is a tank that is sized and shaped to be connected to the retriever immediately to the rear of the collecting surface, the storage tank having an upper edge that is located between the surface of the body of water and the means to transfer the oil on the collecting surface to the storage means.

9. An oil retriever as claimed in any one of claim 1, 2 or 3 further including control means to control the speed of rotation of the collecting surface and to control the speed and direction movement of the oil retriever relative to the oil on the surface of the body of water.

10. An oil retriever as claimed in claim 3 wherein the collecting surface is a drum with closed ends, with a shelf extending through the drum along its central axis, said shaft being rotatably mounted and connected to said first power means.

11. An oil retriever as claimed in claim 10 wherein said first power means is operable so that the collecting surface can be rotated in reverse direction.

12. An oil retriever as claimed in claim 11 wherein said first power means has a variable speed.

13. An oil retriever as claimed in claim 12 wherein said first power means is a gasoline powered motor.

14. An oil retriever as claimed in claim 3 wherein the storage means is a tank that is sized and shaped to e connected to the retriever immediately to the rear of the collecting surface, the storage tank having an upper edge that is located between the surface of the body of water and a means to transfer the oil on the collecting surface to the storage means, and the retriever is operable so that a base of the storage tank is located below the surface of the body of water when the retriever is recovering the heavy oil.

15. An oil retriever as claimed in claim 14 wherein the storage tank contains side tanks in addition to an oil storage section, the side tanks being used to adjust the buoyancy of the tank.

16. An oil retriever ad claimed in claim 15 wherein the storage tank is held in position within the retriever by means of a dog lever mounted on a frame of the retriever.

17. An oil retriever as claimed in claim 16 wherein there is a baffle located between the collecting surface and the storage tank, said baffle preventing oil being collected from contacting a front edge of said storage tank.

18. An oil retriever as claimed in claim 3 wherein the means to remove oil collected on the collecting surface is a first scraper that is rigidly held to form a line of contact with the collecting surface, said first scraper being mounted on said retriever so that is does not move relative to said collecting surface.

19. An oil retriever as claimed in claim 18 wherein the first scraper is located at or near a rear edge of said collecting surface and a second scraper is located below said first scraper, said second scraper being out of contact with said collecting surface by a sufficient distance to permit a film of oil on said collecting surface to pass by said second scraper as said collecting surface rotates, said film of oil being removed from the collecting surface by said first scraper, said second scraper being located at an angle so that the film of oil runs by gravity from said first scraper down the second scraper and into the storage tank, said second scraper providing means to transfer the oil to said storage tank.

20. An oil retriever as claimed in claim 19 wherein the scrapers extend along an entire length of said collecting surface.

21. An oil retriever as claimed in claim 3 wherein the buoyancy means for the retriever is floats that are located on either side of said storage means, said floats being connected by cross-members that hold the floats in a fixed position relative to one another.

22. An oil retriever as claimed in claim 21 wherein the floats are pontoons, the storage means is a storage tank and there are two pontoons that are located on either side of said storage tank, said pontoons being substantially parallel to one another and extending from said collecting surface to the rear of said retriever beyond said storage tank, each pontoon supporting a channel along its inner upper edge, said channel being sized to receive a corresponding flange on said storage tank, said storage tank being designed so that it can be inserted into or removed from the rear of said oil retriever.

23. An oil retriever as claimed in claim 22 wherein the pontoons contain a trim adjustment so that a flotation level of the retriever can be adjusted relative to a flotation level of the tank.

24. An oil retriever as claimed in claim 23 wherein the second power means is two outboard motors, one connected to a rear end of each pontoon, said outboard motors allowing the oil retriever to be self-propelled on said surface of the body of water.

25. An oil retriever as claimed in claim 24 wherein the trim adjustment means are trim tanks on said pontoons and further including means to fill and drain said trim tanks.

26. A method of recovering heavy oil, including bunker c, from a surface of bodies of water, such as oceans, lakes, rivers or the like, said method using an oil retriever having a cylindrically-shaped collecting surface for contacting the oil and water, said surface being rotatable about its longitudinal central axis, first power means to rotate said collecting surface abut said axis, a removable storage tank for storing the oil collected by said collecting surface, said tank initially being filled with water and having an initially opened valve to allow the water in the tank to escape as the tank is filled with oil, scraper means to remove the oil from the collecting surface and transfer it to the storage tank, support means for supporting said collecting surface relative to said surface of the body of water so that said collecting surface contacts said surface as it rotates during collection of oil, second power means to enable the collecting surface to be moved about said surface of the body of water, and control means to control the second power means, said method comprising the steps of activating the second power means and control means to position the collecting surface of the retriever into an oil slick on a surface of a body of water, opening the valve in the storage tank to allow water to escape as the tank fills with oil, activating the first power means to rotate the collecting surface in a direction so that a forward edge thereof moves downward into the oil, collecting the oil into the storage tank until the tank is filled, while periodically stopping the first power means if necessary and reactivating it to rotate the collecting surface in a reverse direction to release any oil clogged between the collecting surface and the tank, closing the valve in the storage tank when the tank has been filled with oil and stopping the rotation of the collection surface, removing the tank from the retriever, replacing it with another tank that is filled with water and repeating the collection process to fill the tank in the retriever with oil.

27. A method of recovering heavy oil, including bunker c, from a surface of bodies of water, such as oceans, lakes, rivers or the like, said method using an oil retriever having a cylindrically-shaped collecting surface for contacting the oil and eater, said collecting surface being a drum with closed ends, said drum being light enough to float on the surface of the body of water, said drum being rotatable about is longitudinal central axis, first power means to rotate said drum about said axis, a removable storage tank for storing the oil collected by said drum, said tank initially being filled with water and having an initially opened allow the water in the tank to escape as the tank is filled with oil, scraper means to remove the oil from the drum and transfer it to the storage tank, support means for supporting said drum relative to said surface of a body of water so that said collecting surface contacts said surface as it rotates during operation, said support means permitting independent movement of said drum as it floats relative to the rest of the retriever, second power means to enable the collecting surface to be moved about said surface of the body of water, and control means to control the second power means, said retriever having two pontoons located along either side of said drum and tank, said pontoons supporting said drum and tank relative to one another, said method comprising the steps of activating the second power means and control means to position the drum into an oil slick on a surface of the body of eater, opening the valve in the storage tank to allow water to escape as the tank fills with oil, activating the first power means to rotate the drum in a direction so that a forward edge thereof moves downward into the oil, the scraper means automatically removing the oil from the drum and transferring the oil into the storage tank, continuing to rotate said drum until the tank is filled with oil, while periodically stopping the first power means if necessary and reactivating it to rotate the collecting surface of the drum in a reverse direction to release any oil clogged between the drum and the tank, closing the valve in the storage tank when the tank has been filled with oil and stopping the rotation of the collecting surface, removing the tank from the retriever, replacing the tank with a second tank that is filled with water and repeating the oil recovery process to fill the second tank in the retriever with oil.

* * * * *